(12) United States Patent
England et al.

(10) Patent No.: US 11,232,454 B2
(45) Date of Patent: Jan. 25, 2022

(54) AUTHENTICATION FRAMEWORK FOR REAL-TIME DOCUMENT PROCESSING

(71) Applicant: Bank of America Corporation, Charlotte, NC (US)

(72) Inventors: Tony England, Tega Cay, SC (US); Stephen Philip Selfridge, Huntersville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 91 days.

(21) Appl. No.: 16/683,327

(22) Filed: Nov. 14, 2019

(65) Prior Publication Data

US 2021/0150533 A1    May 20, 2021

(51) Int. Cl.
| | | |
|---|---|---|
| G06Q 10/00 | (2012.01) | |
| G06Q 20/40 | (2012.01) | |
| G06Q 20/20 | (2012.01) | |
| G06Q 20/36 | (2012.01) | |
| G06Q 20/32 | (2012.01) | |
| G06K 9/46 | (2006.01) | |

(52) U.S. Cl.
CPC ............ *G06Q 20/4037* (2013.01); *G06K 9/46* (2013.01); *G06Q 20/202* (2013.01); *G06Q 20/204* (2013.01); *G06Q 20/3227* (2013.01); *G06Q 20/3674* (2013.01); *G06Q 20/40145* (2013.01); *G06K 2209/01* (2013.01)

(58) Field of Classification Search
CPC .................................................. G06Q 20/4037
USPC ........................................................ 705/17
See application file for complete search history.

(56) References Cited

U.S. PATENT DOCUMENTS

| | | |
|---|---|---|
| 6,931,589 B2 | 8/2005 | Baltsan et al. |
| 7,283,656 B2 | 10/2007 | Blake et al. |
| 7,594,600 B2 | 9/2009 | Mueller et al. |
| 7,686,209 B2 | 3/2010 | Mueller et al. |
| 7,711,176 B2 | 5/2010 | Rossignoli |
| 7,802,717 B2 | 9/2010 | Mueller et al. |
| 7,873,200 B1 | 1/2011 | Oakes, III et al. |
| 8,018,632 B2 | 9/2011 | Walker et al. |
| 8,023,717 B1 | 9/2011 | Gudenburr et al. |
| 8,023,718 B1 | 9/2011 | Gudenburr et al. |
| 8,032,462 B2 | 10/2011 | Mueller et al. |
| 8,112,357 B2 | 2/2012 | Mueller et al. |
| 8,351,677 B1 | 1/2013 | Oakes, III et al. |
| 8,387,862 B2 | 3/2013 | Mueller et al. |

(Continued)

*Primary Examiner* — Rokib Masud
(74) *Attorney, Agent, or Firm* — Moore & Van Allen PLLC; Anup Shrinivasan Iyer

(57) ABSTRACT

Systems, computer program products, and methods are described herein for an authentication framework for real-time document processing. The present invention is configured to receive, via an image capturing device associated with a point-of-sale system of a merchant, a digital image of a payment instrument; extract, using optical character recognition, payment instrument data from the payment instrument; receive one or more authentication credentials from the user to endorse the payment instrument; determine an authentication level of the user based on at least receiving the one or more authentication credentials from the user; determine whether the authentication level of the user meets an authentication requirement level associated with the processing of the payment instrument; and process, in real-time, the payment instrument.

20 Claims, 3 Drawing Sheets

(56) References Cited

U.S. PATENT DOCUMENTS

| | | |
|---|---|---|
| 8,504,828 B2 | 8/2013 | Quine |
| 8,708,227 B1 | 4/2014 | Oakes, III et al. |
| 8,799,147 B1 | 8/2014 | Walls et al. |
| 9,195,820 B2 * | 11/2015 | O'Neill ................. H04L 63/105 |
| 10,380,559 B1 | 8/2019 | Oakes, III et al. |
| 2005/0097046 A1 | 5/2005 | Singfield |
| 2008/0208727 A1 | 8/2008 | McLaughlin et al. |
| 2011/0251892 A1 * | 10/2011 | Laracey ............. G06Q 30/0253 705/14.51 |
| 2012/0323733 A1 * | 12/2012 | Hernandez ........... G06Q 20/341 705/26.41 |
| 2015/0128240 A1 * | 5/2015 | Richards ............. H04L 63/0861 726/7 |

* cited by examiner

AUTHENTICATION FRAMEWORK FOR REAL-TIME DOCUMENT PROCESSING

FIELD OF THE INVENTION

The present invention embraces an authentication framework for real-time document processing.

BACKGROUND

In recent years, processing a payment instrument has become more efficient by eliminating the need to physically deposit the check at the financial institution and reducing the delay by turning a paper check into an electronic check. As payment instrument processing times have reduced, authentication requirements for the user have increased.

There is a need for a system for an authentication framework for real-time payment instrument processing.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for real-time payment instrument processing and reconciliation of a payment instrument at a merchant point-of-sale system within an authentication framework is presented. The system comprises: at least one non-transitory storage device; and at least one processing device coupled to the at least one non-transitory storage device, wherein the at least one processing device is configured to: receive, via an image capturing device associated with a point-of-sale system of a merchant, a digital image of a payment instrument, wherein the payment instrument is associated with a user; extract, using optical character recognition, payment instrument data from the payment instrument, wherein the payment instrument data comprises at least a payment amount; receive one or more authentication credentials from the user to endorse the payment instrument; determine an authentication level of the user based on at least receiving the one or more authentication credentials from the user; determine whether the authentication level of the user meets an authentication requirement level associated with the processing of the payment instrument based on at least the payment instrument data; and process, in real-time, the payment instrument based on at least determining which authentication requirement level is met by the authentication level of the user, wherein processing further comprises transferring the payment amount from a financial institution account associated with the user to a financial institution account associated with the merchant.

In some embodiments, the at least one processing device is further configured to: establish a communication link between the point-of-sale system of the merchant and a user device; and receive, via the established communication link, at least a first portion of the one or more authentication credentials from the user device.

In some embodiments, the at least one processing device is further configured to: initiate an authentication application stored on the user device in response to establishing the communication link, wherein the authentication application is associated with the financial institution account associated with the user; initiate, via the authentication application, an authentication request to the user; receive, via the authentication application, at least the first portion of the one or more authentication credentials; and transmit, via the established communication link, the first portion of the one or more authentication credentials to the point-of-sale system of the merchant.

In some embodiments, the at least one processing device is further configured to: determine that the financial institution account of the user and the financial institution account of the merchant are associated with the same financial institution; downgrade the authentication requirement level associated with the processing of the payment instrument from a first level to a second level, wherein meeting the second level of the authentication requirement level comprises requiring at least a reduced number of the one or more authentication credentials from the user compared to the first level of the authentication requirement level; initiate a request to receive a second portion of the one or more authentication credentials from the user to endorse the payment instrument, wherein the second portion of the one or more authentication credentials meets the second level of the authentication requirement level but does not meet the first level of the authentication requirement level; receive the second portion of the one or more authentication credentials from the user to endorse the payment instrument; and process, in real-time, the payment instrument based on at least receiving the second portion of the one or more authentication credentials.

In some embodiments, the at least one processing device is further configured to: determine that the user has previously used one or more similar payment instruments at the point-of-sale system of the merchant and the one or more similar payment instruments were processed successfully; and downgrade the authentication requirement level associated with the processing of the payment instrument from the first level to the second level.

In some embodiments, the at least one processing device is further configured to determine whether the financial institution account of the user has adequate amount of funds to satisfy the payment amount.

In some embodiments, the at least one processing device is further configured to: determine account identification information associated with the financial institution account of the user based on at least the payment instrument data; initiate a request to receive an account balance associated with the financial institution account of the user based on at least determining the account identification information; and determine that the user has adequate amount of funds to satisfy the payment amount based on at least determining that the account balance is greater than the payment amount.

In some embodiments, the at least one processing device is further configured to: determine that the user does not have adequate amount of funds to satisfy the payment amount based on at least determining that the account balance is lower than the payment amount; and upgrade the authentication requirement level associated with the processing of the payment instrument from the second level to the first level, wherein meeting the first level of the authentication requirement level comprises requiring at least an increased number of the one or more authentication credentials from the user compared to the second level of the authentication requirement level.

In some embodiments, meeting the first level of the authentication requirement level comprises requiring at least a portion of the one or more authentication credentials to be associated with a first authentication type, and meeting the second level of authentication requirement level comprises requiring at least a portion of the one or more authentication credentials to be associated with a second authentication type, wherein the first authentication type and the second authentication type are associated with one or more authentication types.

In some embodiments, the one or more authentication types comprises at least a unique alias, biometrics, authentication using an overarching application, and/or token based authentication.

In some embodiments, the at least one processing device may be configured to determine the authentication requirement level based on at least the financial institution of the user, the financial institution of the merchant, the payment amount, and/or a number of times the user has previously used one or more similar payment instruments at the point-of-sale system of the merchant.

In another aspect, a computer implemented method for real-time check processing and reconciliation at a merchant point-of-sale system within a dynamic authentication framework is presented. The method comprising: receiving, via an image capturing device associated with a point-of-sale system of a merchant, a digital image of a payment instrument, wherein the payment instrument is associated with a user; extracting, using optical character recognition, payment instrument data from the payment instrument, wherein the payment instrument data comprises at least a payment amount; receiving one or more authentication credentials from the user to endorse the payment instrument; determining an authentication level of the user based on at least receiving the one or more authentication credentials from the user; determining whether the authentication level of the user meets an authentication requirement level associated with the processing of the payment instrument based on at least the payment instrument data; and processing, in real-time, the payment instrument based on at least determining which authentication requirement level is met by the authentication level of the user, wherein processing further comprises transferring the payment amount from a financial institution account associated with the user to a financial institution account associated with the merchant.

In yet another aspect, a computer program product for real-time check processing and reconciliation at a merchant point-of-sale system within a dynamic authentication framework is presented. The computer program product comprising a non-transitory computer-readable medium comprising code causing a first apparatus to: receive, via an image capturing device associated with a point-of-sale system of a merchant, a digital image of a payment instrument, wherein the payment instrument is associated with a user; extract, using optical character recognition, payment instrument data from the payment instrument, wherein the payment instrument data comprises at least a payment amount; receive one or more authentication credentials from the user to endorse the payment instrument; determine an authentication level of the user based on at least receiving the one or more authentication credentials from the user; determine whether the authentication level of the user meets an authentication requirement level associated with the processing of the payment instrument based on at least the payment instrument data; and process, in real-time, the payment instrument based on at least determining which authentication requirement level is met by the authentication level of the user, wherein processing further comprises transferring the payment amount from a financial institution account associated with the user to a financial institution account associated with the merchant.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
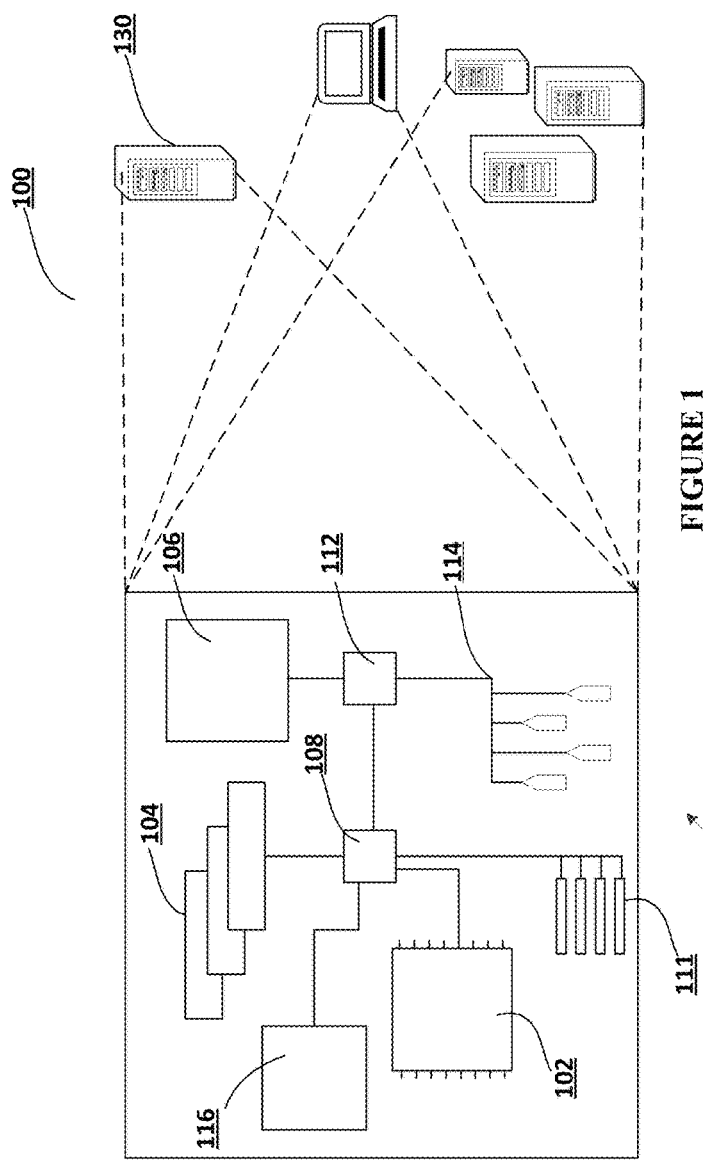
Figure 1:
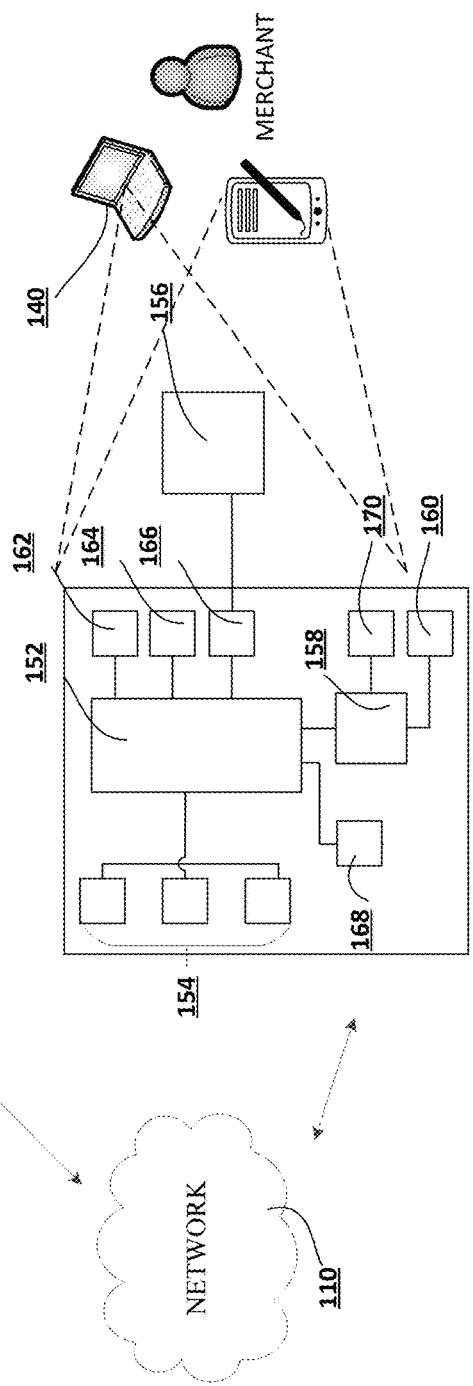
Figure 2:
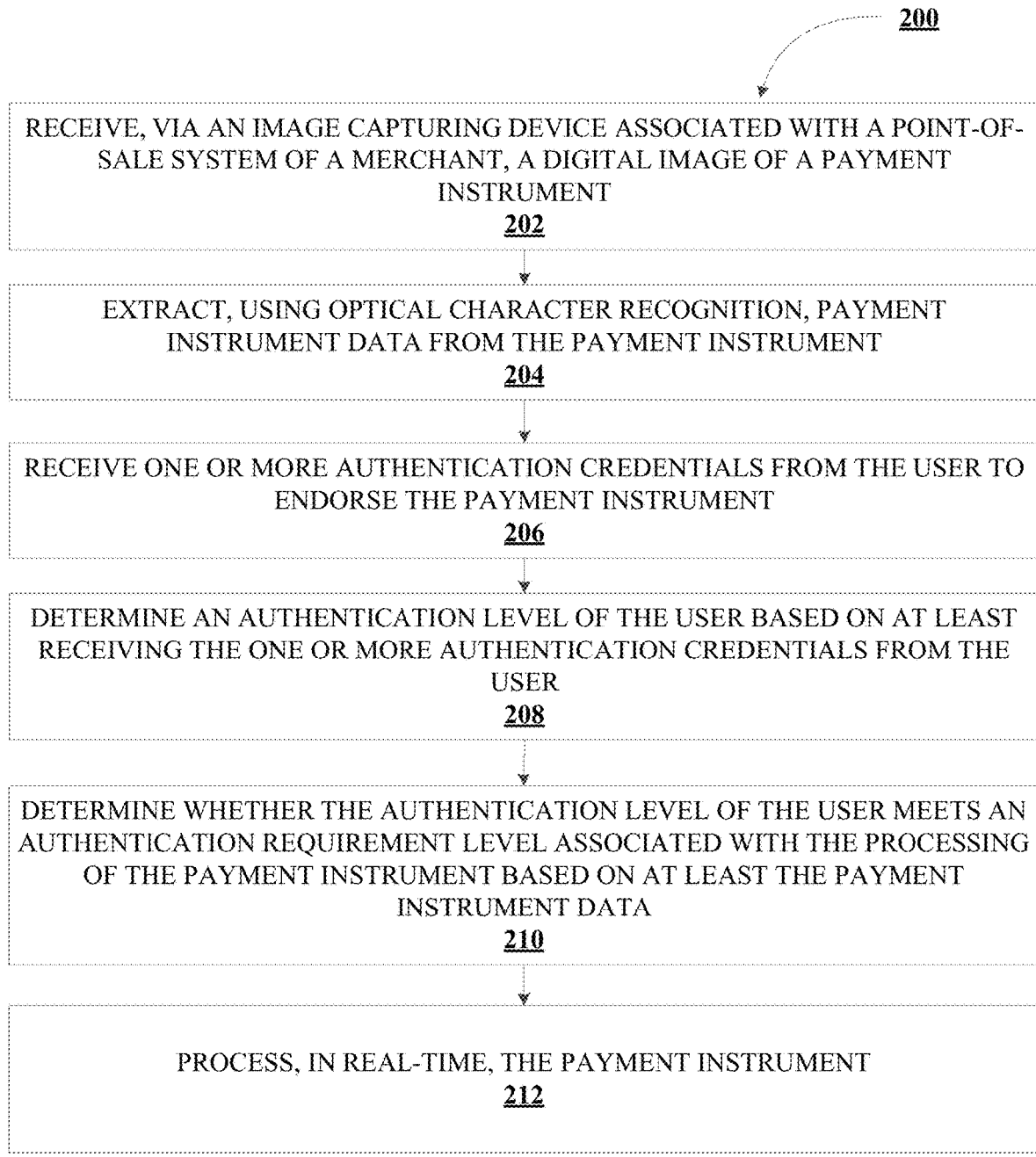
Figure 3:
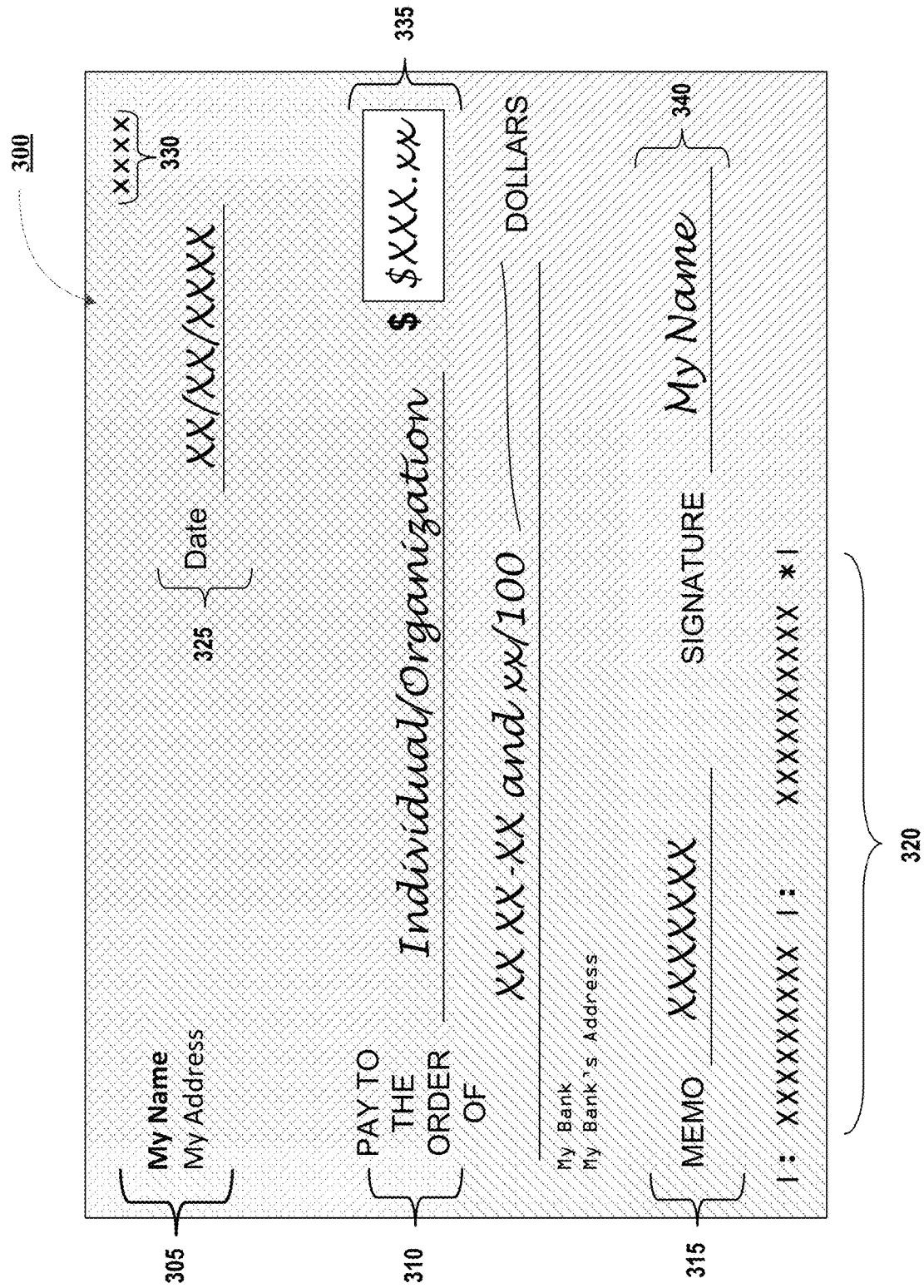

Having thus described embodiments of the invention in general terms, reference will now be made the accompanying drawings, wherein:

FIG. 1 illustrates technical components of a system for an authentication framework for real-time document processing, in accordance with an embodiment of the invention;

FIG. 2 illustrates a process flow for an authentication framework for real-time document processing, in accordance with an embodiment of the invention; and FIG. 3 provides an illustration of an exemplary image of a financial payment instrument, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, account holders, agents of account holders, family members of account holders, financial institution customers, payors, payees, third parties, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

FIG. 1 presents an exemplary block diagram of the system environment for an authentication framework for real-time document processing 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a merchant point-of-sale system 140. Also shown in FIG. 1 is a user of the merchant point-of-sale system 140. The merchant point-of-sale system 140 may be a smart mobile device or other smart non-mobile computing device. The merchant may be a person who uses the merchant point-of-sale system 140 to execute one or more applications stored thereon. The one or more applications may be configured to communicate with the system 130, perform a transaction, input information onto a user interface presented on the merchant point-of-sale system 140, or the like. The applications stored on the merchant point-of-sale system 140 and the system 130 may incorporate one or more parts of any process flow described herein.

As shown in FIG. 1, the system 130, and the merchant point-of-sale system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the merchant point-of-sale system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The merchant point-of-sale system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a merchant point-of-sale system 140, in accordance with an embodiment of the invention. The merchant point-of-sale system 140 includes a processor 152, memory 154, an input/output device such as a display 156, a communication interface 158, and a transceiver 160, among other components. The merchant point-of-sale system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the merchant point-of-sale system 140, including instructions stored in the memory 154. The processor may be implemented as a chipset of chips that include separate and multiple analog and digital processors. The processor may be configured to provide, for example, for coordination of the other components of the merchant point-of-sale system 140, such as control of user interfaces, applications run by merchant point-of-sale system 140, and wireless communication by merchant point-of-sale system 140.

The processor 152 may be configured to communicate with the merchant through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a merchant. The control interface 164 may receive commands from a merchant and convert them for submission to the processor 152. In addition, an external interface 168 may be provided in communication with processor 152, so as to enable near area communication of merchant point-of-sale system 140 with other devices. External interface 168 may provide, for example, for wired communication in some implementations, or for wireless communication in other implementations, and multiple interfaces may also be used.

The memory 154 stores information within the merchant point-of-sale system 140. The memory 154 can be implemented as one or more of a computer-readable medium or media, a volatile memory unit or units, or a non-volatile memory unit or units. Expansion memory may also be provided and connected to merchant point-of-sale system 140 through an expansion interface (not shown), which may include, for example, a SIMM (Single In Line Memory Module) card interface. Such expansion memory may provide extra storage space for merchant point-of-sale system 140, or may also store applications or other information therein. In some embodiments, expansion memory may include instructions to carry out or supplement the processes described above, and may include secure information also. For example, expansion memory may be provided as a security module for merchant point-of-sale system 140, and may be programmed with instructions that permit secure use of merchant point-of-sale system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the merchant may use the merchant point-of-sale system 140 to transmit and/or receive information or commands to and from the system 130 to process payment instruments received from a customer when executing transactions. In this regard, the system 130 may be configured to establish a communication link with the merchant point-of-sale system 140, whereby the communication link establishes a data channel (wired or wireless) to facilitate the transfer of data between the merchant point-of-sale system 140 and the system 130. In doing so, the system 130 may be configured to access one or more aspects of the merchant point-of-sale system 140, such as, a GPS device, an image capturing component (e.g., camera), a microphone, a speaker, or the like.

The merchant point-of-sale system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to merchant point-of-sale system 140, which may be used as appropriate by applications running thereon, and in some embodiments, one or more applications operating on the system 130.

The merchant point-of-sale system 140 may also communicate audibly using audio codec 162, which may receive spoken information from a merchant and convert it to usable digital information. Audio codec 162 may likewise generate audible sound for a merchant, such as through a speaker, e.g., in a handset of merchant point-of-sale system 140. Such sound may include sound from voice telephone calls, may include recorded sound (e.g., voice messages, music files, etc.) and may also include sound generated by one or more applications operating on the merchant point-of-sale system 140, and in some embodiments, one or more applications operating on the system 130.

In some embodiments, the merchant point-of-sale system 140 may be configured to communicate with a user device, in accordance with an embodiment of the invention. The user device may be conventional in its hardware aspects but may be controlled by software to cause it to operate in accordance with aspects of the present invention. The user device may be able to communicate with the merchant point-of-sale system 140 wirelessly using digital signal processing circuitry where necessary under various modes or protocols, such as GSM voice calls, SMS, EMS, or MMS messaging, CDMA, TDMA, PDC, WCDMA, CDMA2000, or GPRS, among others. In addition, short-range communication may occur, such as using a Bluetooth, Wi-Fi, or other such transceiver (not shown). In addition, GPS (Global Positioning System) receiver module may provide additional navigation—and location-related wireless data to user input system 150, which may be used as appropriate by applications running thereon, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a merchant, the systems and techniques described here can be implemented on a computer having a display device (e.g., a CRT (cathode ray tube) or LCD (liquid crystal display) monitor) for displaying information to the merchant and a keyboard and a pointing device (e.g., a mouse or a trackball) by which the merchant can provide input to the computer. Other kinds of devices can be used to provide for interaction with a merchant as well; for example, feedback provided to the user can be any form of sensory feedback (e.g., visual feedback, auditory feedback, or tactile feedback); and input from the merchant can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a merchant can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

The present invention contemplates an instantaneous check depositing system with a point-of-sale system at a merchant location. Current point-of-sale systems at merchant locations are provided with smart terminal technology capable of, among other things, an image capturing capabilities. The system may be configured to enable a merchant to capture an image of the payment instrument for instantaneous payment instrument deposit and reconciliation. In this regard, the system of the present invention may be configured to use the captured images and generate remote deposit cash letters to be reconciled in near real-time. By capturing the image of the payment instrument at the point-of-sale system of the merchant, the present invention provides the functional benefit of identifying whether the received check is potentially unauthorized, and in addition, confirming whether the user has adequate funds to execute the transaction.

In situations where both the user and the merchant use the same financial institution, the system of the present invention facilitates seamless transaction processing by enabling real-time payment instrument reconciliation. Typically, merchants who accept payment instruments (e.g., checks) from their users may be forced to wait until at least end of business day before being able to deposit them with the financial institution. By facilitating real-time payment instrument reconciliation and settlement, the system of the present invention helps businesses trim expenses and provides the benefit of a direct withdrawal from a user's financial institution account, realizing real-time collections.

FIG. 2 illustrates a process flow for an authentication framework for real-time document processing 200, in accordance with an embodiment of the invention. As shown in block 202, the process flow includes receiving, via an image capturing device associated with a point-of sale system of a merchant, a digital image of a payment instrument. In some embodiments, the payment instrument may be presented by a user at the point-of-sale system of the merchant to execute a transaction. As used herein, a "payment instrument" may be any electronic or written check, draft, money order, traveler's check, or other electronic or written instrument or order for transmission or payment of money that is associated with a financial institution, where the user has a financial institution account.

In some embodiments, an image capturing component associated with the merchant point-of-sale system may be configured to capture an image of the payment instrument. In some other embodiments, the user may capture a picture of the payment instrument using the image capturing device associated with the user device and communicate the payment instrument image to the merchant point-of-sale system via wireless technologies such as nearfield communication (NFC), radio frequency identification (RFID), and/or other technologies contemplated herein. In one aspect, the payment instrument image may be communicated to the merchant point-of-sale system via email, short messaging service (SMS) text, a web portal, online account, mobile applications, and the like. Exemplary check images include PDF files, scanned documents, digital photographs, and the like.

Next, as shown in block 204, the process flow includes extracting, using optical character recognition, payment instrument data from the payment instrument. In some embodiments, the system may be configured to implement optical character recognition processes to distinguish printed or handwritten characters inside digital images of physical documents, such as a scanned paper document. In this way, text and other symbols in the payment instrument images may be converted to other formats such as text files and/or metadata, which can then be used and incorporated into a variety of applications, documents, and processes. In some embodiments, optical character recognition based algorithms incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

Next, as shown in block 206, the process flow includes receiving one or more authentication credentials from the user to endorse the payment instrument. In one aspect, the point-of-sale system of the merchant may be equipped with one or more devices capable of receiving authentication credentials associated with different authentication credential types. In some embodiments, an authentication credential type may be something the user knows. Examples of such authentication credentials include, but are not limited to, a username, a password, a personal identification number (PIN), a passcode, an answer to a security question, a unique intrinsic user activity, such as making a predefined motion with a user device, and/or the like. In some other embodiments, an authentication credential type may be something the user possesses, such as a security token. A security token may be a small hardware device in the form of a smart card or may be embedded in a key fob. In yet other embodiments, an authentication credential type may be something the user is, such as fingerprints, gait, facial features or eyes, which can be used as a factor of identity verification. Accordingly, the user may provide the authentication credentials, via the point-of-sale system of the merchant, to endorse the payment instrument.

In some embodiments, an authentication credential type may include authenticating the user using an authentication application stored on the user device. In this regard, the system may be configured to determine that the user is in possession of the user device when attempting to execute a transaction using the payment instrument. In response, the system may be configured to establish a communication link between the point-of-sale system of the merchant and a user device. Once established, the system may be configured to initiate an authentication application stored on the user device. In one aspect, the authentication application may be associated with the financial institution account associated with the user. In response to initiating the authentication application, the system may be configured to receive the authentication credentials from the user device. Once received, the system may be configured to transmit the authentication credentials to the point-of-sale system of the merchant. In some embodiments, the authentication credentials may be any combination of the authentication credential types contemplated herein.

Next, as shown in block 208, the process flow includes determining an authentication level of the user based on at least receiving the one or more authentication credentials from the user. Accordingly, a continuum of authentication may be used to quantify (or dictate) the levels of authentication. Likewise, a continuum of transactions permitted may be used to quantify (or dictate) the transactions that may be executed using the payment instrument. On one end of the continuum, a "zero authentication" requires no authentication credentials. On the other end of the continuum, a "hard authentication" requires full authentication credentials. In between the two extremes, a "soft authentication" requires minimal credentials, moderate credentials or most credentials required and/or the relative strength of the credentials required for that point on the continuum. Each authentication level may be defined by either a number of authentication credentials and/or a combination of authentication types as described herein.

Next, as shown in block 210, the process flow includes determining whether the authentication level of the user meets an authentication requirement level associated with the processing of the payment instrument based on at least the payment instrument data. In some embodiments, an authentication requirement level may define a level of authentication that the user must meet to execute the transaction using the payment instrument. The stronger the authentication requirement level, the higher the authentication level that the user must meet to execute the transaction using the payment instrument. The weaker the authentication requirement level, the lower the authentication level that the user must meet to execute the transaction using the payment instrument. In some embodiments, the authentication requirement level may be determined based on a combination of a number of factors such as the financial institution account associated with the payment instrument presented by the user, the financial institution of the merchant, the payment amount, a number of times the user has previously used one or more similar payment instruments at the point-of-sale system of the merchant, and/or the like.

In some embodiments, the system may be configured to determine that the financial institution account of the user and the financial institution account of the merchant are associated with the same financial institution. In response, the system may be configured to downgrade the authentication requirement level associated with the processing of the payment instrument, i.e., if the existing authentication requirement level is a hard authentication, the system may be configured to downgrade the authentication requirement level to a soft authentication, or if the existing authentication requirement level is a soft authentication, the system may be configured to downgrade the authentication requirement level to zero authentication. Here, in one aspect, meeting a lower authentication requirement level includes requiring at least a reduced number of the one or more authentication credentials from the user compared to the higher requirement level. For example, a soft authentication may require a combination of username/password and a security token, and hard authentication may require a combination of a username/password and the user's biometric information. In another aspect, meeting a lower authentication requirement level includes requiring authentication credentials associated with a first authentication type and meeting a higher authentication requirement level includes requiring authentication credentials associated with a second authentication type. For example, a soft authentication may require the use of a security token, while hard authentication may require the user's biometric information. In response to downgrading the authentication requirement level, the system may be configured to initiate a request to receive a combination of authentication credentials from the user to endorse the payment instrument, wherein the combination of authentication credentials meets the lower authentication level but does not meet the higher authentication level. For example, the combination of authentication credentials from the user meets the soft authentication but does not meet the hard authentication.

In some embodiments, if the user has previously used one or more similar payment instruments at the point-of-sale system of the merchant and the one or more similar payment instruments were processed successfully, the authentication requirement level associated with the processing of the payment instrument may be downgraded from a higher authentication level to a lower authentication level. In one aspect, downgrading the authentication requirement level may include automatically receiving an indication from the point-of-sale system of the merchant, a request to downgrade the authentication requirement level. In response to receiving the request, the system may be configured to downgrade the authentication level. In response, the system may be configured to transmit a notification to the point-of-sale system of the merchant and the user device that the authentication requirement level has been downgraded. In some embodiments, the notification may include information associated with at least a number of authentication credentials and/or an authentication type required to satisfy the downgraded authentication requirement level.

In some embodiments, the system may be configured to determine whether the financial institution account of the user has adequate amount of funds to satisfy the payment amount, in response to a request received from the merchant point-of-sale system. In this regard, the system may be configured to determine account identification information associated with the financial institution account of the user based on the payment instrument data. In one aspect, the system may be configured to initiate a request to receive an account balance based on at least determining the account identification information. In response, the system may be configured to receive the account balance from the financial institution account of the user. Based on receiving the account balance, the system may be configured to determine that the user has adequate amount of funds to satisfy the payment amount based on at least determining that the account balance is greater than the payment amount. In response to determining that the user has adequate amount of funds to satisfy the payment amount, the system may be configured to transmit a notification to the merchant point-of-sale system indicating that the user has adequate amount of funds to execute the transaction.

In some embodiments, the merchant may be required to obtain user permission to access the account balance of the user from the financial institution account of the user. In one aspect, the payment instrument received from the user may include an indication that the user has implicitly provided the point-of-sale system of the merchant permission to access the financial institution account of the user to determine whether the financial institution account has adequate funds to execute the transaction. This indication on the payment instrument may be scannable by one or more devices associated with the point-of-sale system of the merchant, capturable by the image capturing device associated with the point-of-sale system of the merchant, readable by OCR algorithms when retrieving payment instrument data, or detectable during processing of the payment instrument in any other way. In another aspect, in response to receiving a request from the merchant to determine whether the user has adequate funds to satisfy the payment amount, the system may be configured to initiate a notification, via a mobile application stored on the user device, a request to authorize the financial institution to make the determination and provide the merchant with the information. The user may then provide authorization to enable to the system to determine whether the financial institution account of the user has adequate funds to satisfy the payment amount, and communicate the information to the merchant accordingly.

In some embodiments, the system may be configured to determine that the user does not have adequate amount of funds to satisfy the payment amount based on at least determining that the account balance is lower than the payment amount. In response, the system may be configured to deny the transaction at the merchant point-of-sale terminal, requiring alternate payment instrument to execute the transaction. In addition, the system may be configured to upgrade the authentication requirement level associated with the processing of the payment instrument from zero authentication to a soft authentication level, or a zero authentication to a hard authentication level, or a soft authentication to a hard authentication level. In some embodiments, upgrading the authentication requirement level from a lower authentication requirement level to a higher authentication requirement level includes requiring additional authentication credentials to execute future transactions at the merchant point-of-sale system using same or similar payment instruments. This may be either a number of authentication credentials or a different authentication credential type, or both.

Next, as shown in block 212, the process flow includes processing, in real-time, the payment instrument. To process the payment instrument in real-time, the system may be configured to manage instantaneous transaction processing, process feedback and to interface with both existing back-end systems and new application programming interfaces (APIs)—all while adhering to complex business rules. In this regard, the system may be configured to receive the payment instrument data from the point-of-sale system of the merchant. In response, the system may be configured to establish a communication link with a payment source (e.g., financial institution of the user) through implemented APIs to initiate the processing of the payment instrument. In response, the system may be configured to receive an indication from the payment source, that the payment instrument has been processed. In some embodiments, processing the payment instrument includes generating a digital cash letter based on the payment instrument data to be transmitted to the financial institution of the merchant. In response to generating the digital cash letter, the system may be configured to receive an indication that the payment source has transmitted the digital cash letter to the financial institution account of the merchant. In some embodiments, in addition to generating the digital cash letter, the system may be configured to receive an indication from the payment source that the payment instrument has been cleared for fund transfer based on the payment instrument data. In response to receiving the indication, the system may be configured to transmit a notification to the point-of-sale system of the merchant and the user device indicating that the payment instrument has been processed and is eligible for funds transfer.

In some embodiments, if the user and the merchant are associated with the same financial institution, the system may be configured to enable the merchant to realize real-time check reconciliation and settlement when the user is executing the transaction with the merchant at the point-of-sale system of the merchant. However, it is not uncommon for the user and the merchant to be associated with different financial institutions. In such cases, the system of the present invention contemplates a network of banks with an agreement of reciprocity to enable real-time check reconciliation and settlement across financial institution platforms. In some embodiments, the system of the present invention contemplates a network of merchants with an agreement of reciprocity to exchange information associated with their users based on their transactions using a specific payment instrument.

FIG. 3 provides an illustration of an exemplary image of a financial payment instrument 300, in accordance with one embodiment of the present invention. The financial payment instrument illustrated in FIG. 3 is a check. However, one will appreciate that any financial record, financial document, payment instrument, or the like may be provided. As shown in FIG. 3, the payment instrument 300 may include payment instrument data such as contact information 305, the payee 310, the memo description 315, the account number and routing number 320 associated with the appropriate user or customer account, the date 325, the payment instrument number 330, the amount of the payment instrument 335, the signature 340, or the like. In some embodiments, the payment instrument data may comprise text. As described herein, a capture device may capture an image of the payment instrument 300 and transmit the image to a back-end system of a financial institution via a network. The system may collect the payment instrument data from the image of the payment instrument 300 and store the payment instrument data in a datastore as metadata. In some embodiments, the pieces of payment instrument data may be stored in the datastore individually. In other embodiments, multiple pieces of payment instrument data may be stored in the datastore together.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for real-time payment instrument processing and reconciliation of a payment instrument at a merchant point-of-sale system within an authentication framework, the system comprising:
   at least one non-transitory storage device; and
   at least one processing device coupled to the at least one non-transitory storage device, wherein the at least one processing device is configured to:
   receive, via an image capturing device associated with a point-of-sale system of a merchant, a digital image of a payment instrument, wherein the payment instrument is associated with a user;
   extract, using optical character recognition, payment instrument data from the payment instrument, wherein the payment instrument data comprises at least a payment amount;
   receive one or more authentication credentials from the user to endorse the payment instrument;
   determine an authentication level of the user based on at least receiving the one or more authentication credentials from the user;
   determine that the authentication level of the user does not meet an authentication requirement level associated with the processing of the payment instrument based on at least the payment instrument data;
determine that a financial institution account of the user and a financial institution account of the merchant are associated with the same financial institution;
downgrade the authentication requirement level associated with the processing of the payment instrument from a first level to a second level, wherein meeting the second level of the authentication requirement level comprises requiring at least a reduced number of the one or more authentication credentials from the user compared to the first level of the authentication requirement level;
determine that the one or more authentication credentials meets the second level of the authentication requirement level but does not meet the first level of the authentication requirement level; and
process, in real-time, the payment instrument based on at least determining that the one or more authentication credentials meet the second level of authentication requirement, wherein processing further comprises transferring the payment amount from a financial institution account associated with the user to a financial institution account associated with the merchant.

2. The system of claim 1, wherein the at least one processing device is further configured to:
establish a communication link between the point-of-sale system of the merchant and a user device; and
receive, via the established communication link, at least a first portion of the one or more authentication credentials from the user device.

3. The system of claim 2, wherein the at least one processing device is further configured to:
initiate an authentication application stored on the user device in response to establishing the communication link, wherein the authentication application is associated with the financial institution account associated with the user;
initiate, via the authentication application, an authentication request to the user;
receive, via the authentication application, at least the first portion of the one or more authentication credentials; and
transmit, via the established communication link, the first portion of the one or more authentication credentials to the point-of-sale system of the merchant.

4. The system of claim 1, wherein the at least one processing device is further configured to:
downgrade the authentication requirement level associated with the processing of the payment instrument from a first level to a second level, wherein meeting the second level of the authentication requirement level comprises requiring at least a reduced number of the one or more authentication credentials from the user compared to the first level of the authentication requirement level;
initiate a request to receive a second portion of the one or more authentication credentials from the user to endorse the payment instrument, wherein the second portion of the one or more authentication credentials meets the second level of the authentication requirement level but does not meet the first level of the authentication requirement level;
receive the second portion of the one or more authentication credentials from the user to endorse the payment instrument; and process, in real-time, the payment instrument based on at least receiving the second portion of the one or more authentication credentials.

5. The system of claim 4, wherein the at least one processing device is further configured to:
determine that the user has previously used one or more similar payment instruments at the point-of-sale system of the merchant and the one or more similar payment instruments were processed successfully; and
downgrade the authentication requirement level associated with the processing of the payment instrument from the first level to the second level.

6. The system of claim 4, wherein the at least one processing device is further configured to determine whether the financial institution account of the user has adequate amount of funds to satisfy the payment amount.

7. The system of claim 6, wherein the at least one processing device is further configured to:
determine account identification information associated with the financial institution account of the user based on at least the payment instrument data;
initiate a request to receive an account balance associated with the financial institution account of the user based on at least determining the account identification information; and
determine that the user has adequate amount of funds to satisfy the payment amount based on at least determining that the account balance is greater than the payment amount.

8. The system of claim 7, wherein the at least one processing device is further configured to:
determine that the user does not have adequate amount of funds to satisfy the payment amount based on at least determining that the account balance is lower than the payment amount; and
upgrade the authentication requirement level associated with the processing of the payment instrument from the second level to the first level, wherein meeting the first level of the authentication requirement level comprises requiring at least an increased number of the one or more authentication credentials from the user compared to the second level of the authentication requirement level.

9. The system of claim 7, wherein meeting the first level of the authentication requirement level comprises requiring at least a portion of the one or more authentication credentials to be associated with a first authentication type, and meeting the second level of authentication requirement level comprises requiring at least a portion of the one or more authentication credentials to be associated with a second authentication type, wherein the first authentication type and the second authentication type are associated with one or more authentication types.

10. The system of claim 9, wherein the one or more authentication types comprises at least a unique alias, biometrics, authentication using an overarching application, and/or token based authentication.

11. The system of claim 1, wherein the at least one processing device may be configured to determine the authentication requirement level based on at least the financial institution of the user, the financial institution of the merchant, the payment amount, and/or a number of times the user has previously used one or more similar payment instruments at the point-of-sale system of the merchant.

12. A computer implemented method for real-time check processing and reconciliation at a merchant point-of-sale system within a dynamic authentication framework, the method comprising:
- receiving, via an image capturing device associated with a point-of-sale system of a merchant, a digital image of a payment instrument, wherein the payment instrument is associated with a user;
- extracting, using optical character recognition, payment instrument data from the payment instrument, wherein the payment instrument data comprises at least a payment amount;
- receiving one or more authentication credentials from the user to endorse the payment instrument;
- determining an authentication level of the user based on at least receiving the one or more authentication credentials from the user;
- determining that the authentication level of the user does not meet an authentication requirement level associated with the processing of the payment instrument based on at least the payment instrument data;
- determining that a financial institution account of the user and a financial institution account of the merchant are associated with the same financial institution;
- downgrading the authentication requirement level associated with the processing of the payment instrument from a first level to a second level, wherein meeting the second level of the authentication requirement level comprises requiring at least a reduced number of the one or more authentication credentials from the user compared to the first level of the authentication requirement level;
- determining that the one or more authentication credentials meets the second level of the authentication requirement level but does not meet the first level of the authentication requirement level; and
- processing, in real-time, the payment instrument based on at least determining that the one or more authentication credentials meet the second level of authentication requirement, wherein processing further comprises transferring the payment amount from a financial institution account associated with the user to a financial institution account associated with the merchant.

13. The method of claim 12, wherein the method further comprises:
- establishing a communication link between the point-of-sale system of the merchant and a user device; and
- receiving, via the established communication link, at least a first portion of the one or more authentication credentials from the user device.

14. The method of claim 13, wherein the method further comprises:
- initiating an authentication application stored on the user device in response to establishing the communication link, wherein the authentication application is associated with the financial institution account associated with the user;
- initiating, via the authentication application, an authentication request to the user;
- receiving, via the authentication application, at least the first portion of the one or more authentication credentials; and
- transmitting, via the established communication link, the first portion of the one or more authentication credentials to the point-of-sale system of the merchant.

15. The method of claim 12, wherein the method further comprises:
- downgrading the authentication requirement level associated with the processing of the payment instrument from a first level to a second level, wherein meeting the second level of the authentication requirement level comprises requiring at least a reduced number of the one or more authentication credentials from the user compared to the first level of the authentication requirement level;
- initiating a request to receive a second portion of the one or more authentication credentials from the user to endorse the payment instrument, wherein the second portion of the one or more authentication credentials meets the second level of the authentication requirement level but does not meet the first level of the authentication requirement level;
- receiving the second portion of the one or more authentication credentials from the user to endorse the payment instrument; and
- processing, in real-time, the payment instrument based on at least receiving the second portion of the one or more authentication credentials.

16. The method of claim 15, wherein the method further comprises:
- determining that the user has previously used one or more similar payment instruments at the point-of-sale system of the merchant and the one or more similar payment instruments were processed successfully; and
- downgrading the authentication requirement level associated with the processing of the payment instrument from the first level to the second level.

17. The method of claim 16, wherein the method further comprises determining whether the financial institution account of the user has adequate amount of funds to satisfy the payment amount.

18. The method of claim 17, wherein the method further comprises:
- determining account identification information associated with the financial institution account of the user based on at least the payment instrument data;
- initiating a request to receive an account balance associated with the financial institution account of the user based on at least determining the account identification information; and
- determining that the user has adequate amount of funds to satisfy the payment amount based on at least determining that the account balance is greater than the payment amount.

19. The method of claim 18, wherein the method further comprises:
- determining that the user does not have adequate amount of funds to satisfy the payment amount based on at least determining that the account balance is lower than the payment amount; and
- upgrading the authentication requirement level associated with the processing of the payment instrument from the second level to the first level, wherein meeting the first level of the authentication requirement level comprises requiring at least an increased number of the one or more authentication credentials from the user compared to the second level of the authentication requirement level.

20. A computer program product for real-time check processing and reconciliation at a merchant point-of-sale system within a dynamic authentication framework, the computer program product comprising a non-transitory computer-readable medium comprising code causing a first apparatus to:

receive, via an image capturing device associated with a point-of-sale system of a merchant, a digital image of a payment instrument, wherein the payment instrument is associated with a user;

extract, using optical character recognition, payment instrument data from the payment instrument, wherein the payment instrument data comprises at least a payment amount;

receive one or more authentication credentials from the user to endorse the payment instrument;

determine an authentication level of the user based on at least receiving the one or more authentication credentials from the user;

determine that the authentication level of the user does not meet an authentication requirement level associated with the processing of the payment instrument based on at least the payment instrument data;

determine that a financial institution account of the user and a financial institution account of the merchant are associated with the same financial institution;

downgrade the authentication requirement level associated with the processing of the payment instrument from a first level to a second level, wherein meeting the second level of the authentication requirement level comprises requiring at least a reduced number of the one or more authentication credentials from the user compared to the first level of the authentication requirement level;

determine that the one or more authentication credentials meets the second level of the authentication requirement level but does not meet the first level of the authentication requirement level; and process, in real-time, the payment instrument based on at least determining that the one or more authentication credentials meet the second level of authentication requirement, wherein processing further comprises transferring the payment amount from a financial institution account associated with the user to a financial institution account associated with the merchant.

\* \* \* \* \*